(12) United States Patent
Mizikovsky (10) Patent No.: US 6,853,729 B1
(45) Date of Patent: Feb. 8, 2005

(54) METHOD AND APPARATUS FOR PERFORMING A KEY UPDATE USING UPDATE KEY

(75) Inventor: Semyon B. Mizikovsky, Morganville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/500,869

(22) Filed: Feb. 9, 2000

(51) Int. Cl.[7] .............................. H04L 9/16; H04L 9/14; H04L 9/08

(52) U.S. Cl. ....................................... 380/249
(58) Field of Search .......................... 380/249, 44, 270

(56) References Cited

U.S. PATENT DOCUMENTS 6,243,811 B1 * 6/2001 Patel .......................... 713/167

FOREIGN PATENT DOCUMENTS

| CA | 2 277 761 | 1/2000 | ............ H04L/9/20 |
| EP | 0 977 452 | 2/2000 | ............ H04Q/7/38 |

OTHER PUBLICATIONS

Hugo Krawczyk, et. al, RFC 2104 Feb. 1997, pp. 3,4.*
TIA/EIA: "Mobile Station–Base Station Compatibility Standard for Dual Mode Spread Spectrum System", *ANSI/TIA/EIA–95–B*, vol. 95b, (Feb. 3, 1999), pp. 6.1–6.574.
EIA/TIA: "Cellular Radiotelecommunications Intersystem Operations Chapter 3", TIA/*EIA–41.3 D*, vol. 41.3D, (Dec. 1997), pp. 3.1–3.416.
European Search Report.

* cited by examiner

*Primary Examiner*—Gregory Morse
*Assistant Examiner*—Thomas M Ho
(74) *Attorney, Agent, or Firm*—Julie A. Garceran (57) ABSTRACT

A system for updating a communications key(s) performs an authentication(s) of the unit and/or of the communications system using an update key. By using the update key to perform the authentication(s), the key update system can reduce communications between a home communications system and a visiting communications system by sending the update key to the visiting communications system while maintaining the communications key at the home communication system. For example, in performing a key update, the home communications system generates a communications key, such as a new authentication key SSD-A-NEW, using a sequence RANDSSD generated at the home communications system and a secret key A-KEY maintained at the home communications system and at the unit. The home communications system generates the update key SSD-KEY also using the sequence RANDSSD and the secret key A-KEY. The home communications system sends the update key SSD-KEY and the sequence RANDSSD to the visiting communications system, and the visiting communications system sends the sequence RANDSSD to the unit. The unit generates the new communications key, such as the new authentication key SSD-A-NEW, and the update key SSD-KEY in the same manner as the home communications system. Because the visiting communications system has the update key SSD-KEY, the visiting authentication system can generate the signature value(s) AUTHSSD and/or AUTHBS using the update key at the visiting communications system to authenticate the unit and/or the communications system.

16 Claims, 6 Drawing Sheets

METHOD AND APPARATUS FOR PERFORMING A KEY UPDATE USING UPDATE KEY

BACKGROUND OF THE INVENTION

1. Field of the Invention

The present invention relates to communications; more specifically, the updating of keys or other information used by communicating parties.

2. Description of Related Art

A typical wireless communications system provides wireless communications services to wireless units within a geographic region. A Mobile Switching Center (MSC) is responsible for, among other things, establishing and maintaining calls between the wireless units and calls between a wireless unit and a wireline unit. As such, the MSC interconnects the wireless units within its geographic region with a public switched telephone network. The geographic area serviced by the MSC is divided into spatially distinct areas called "cells." Each cell is schematically represented by one hexagon in a honeycomb pattern; in practice, however, each cell has an irregular shape that depends on the topography of the terrain surrounding the cell. Typically, each cell contains a base station, which comprises the radios and antennas that the base station uses to communicate with the wireless units in that cell. The base stations also comprise the transmission equipment that the base station uses to communicate with the MSC in the geographic area.

Figure 1:
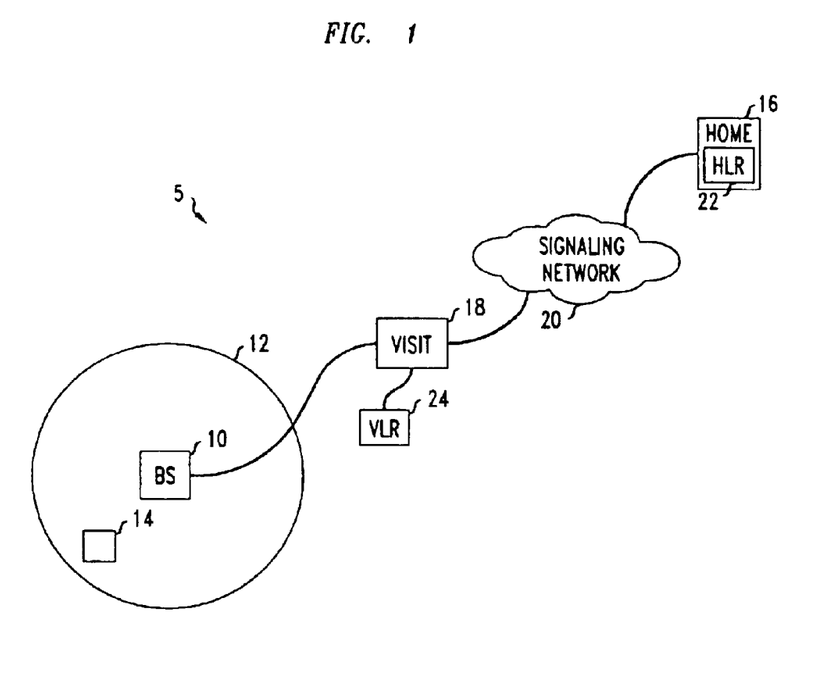
FIG. 1 shows a general diagram of a wireless communications system in which the key update using an update key according to the principles of the present invention can be used.

The MSC use a signaling network, which enables the exchange of information about the wireless units within the respective geographic service area for location validation and call delivery to wireless units which are roaming in other geographic service areas. When a wireless unit attempts communications with the wireless communications system, the wireless communications system authenticates or verifies the wireless unit's identity before allowing the wireless unit access to the wireless communication system. FIG. 1 depicts a portion of a typical wireless communications system 5 which provides wireless communications services through a base station 10 to a geographic region 12, such as a cell or sector, associated with the base station 10. When a wireless unit 14 within the cell 12 first registers or attempts communications with the base station 10, the wireless unit 14 is authenticated or the wireless unit's identity is verified before allowing the wireless unit 14 access to the wireless communication system. The home network or home communications system for the wireless unit 14 can be a collection of cells making up a cellular geographic service area where the wireless unit 14 resides and is typically the network controlled by the service provider that has contracted with the wireless unit's owner to provide wireless communication services. When wireless unit 14 is in a network other than its home network, it is referred to as being in a visiting communications network or system. If the wireless unit 14 is operating in the visiting communication system, the authentication of the wireless unit by base station 10 will involve communicating with a home authentication center 16 of the wireless unit's home communications system. The home authentication center 16 can be a stand-alone center or connected to, associated with, integrated with and/or co-located with the MSC associated with the home communications system (the home MSC), and the visiting authentication center 18 can be in a stand-alone center or connected to, associated with, integrated with and/or co-located with the MSC associated with the visiting communications system (the visited MSC).

In the example of FIG. 1, the wireless unit 14 is in a visiting communications system. As a result, the authentication of the wireless unit 14 involves communicating with the home authentication center 16 of the wireless unit's home communications system. When the wireless unit 14 attempts to access the visiting communications system, base station 10 communicates with a visiting authentication center 18 of the visiting communication system. The visiting authentication center 18 determines from a wireless unit or terminal identifier, such as the telephone number of wireless unit 14, that the wireless unit 14 is registered with a system that uses home authentication center 16. Visiting authentication center 18 then communicates with home authentication center 16 over a network, such as a signaling network 20 under the standard identified as TIA/EIA-41-D entitled "Cellular Radiotelecommunications Intersystem Operations," December 1997 ("IS-41").

Home authentication center 16 then accesses a home location register (HLR) 22 which has a registration entry for wireless unit 14. Home location register 22 may be associated with the wireless unit by an identifier such as the wireless unit's telephone number. The information contained in the home location register 22 can include and/or is used to generate authentication and/or encryption keys, such as a shared secret data (SSD) or communications key used to further secure communications between the wireless unit and the communications system. In a typical wireless communications system, both the wireless unit and the wireless communications system have a secret value called A-KEY. The wireless communications system uses the A-KEY and a randomly generated sequence RANDSSD to generate a shared secret data (SSD) value or communications key. The communications key SSD can be divided into communications keys having different functions, for example an authentication key SSD-A (Shared Secret Data A) and an encryption key SSD-B (Shared Secret Data B). The SSD-A value is used for authentication procedures, and the SSD-B value is used for key generation and encryption procedures.

To authenticate the wireless unit 14 attempting access to the visiting communications system, the home communications system supplies information, such as a random number sequence or challenge RAND, to the visiting communications system which transmits the random number RAND to the wireless unit 14 so that wireless unit 14 can respond with a signature value AUTHR derived using the authentication key (SSD-A) and the random number RAND. If the home communications system does not share the communications key with the visiting communications system, the signature value AUTHR generated by the wireless unit is sent to the home communications system to be compared with a signature value AUTHR generated at the home communications system in the same manner as the unit 14. If the signature values match, the wireless unit 14 is authenticated.

Figure 2:
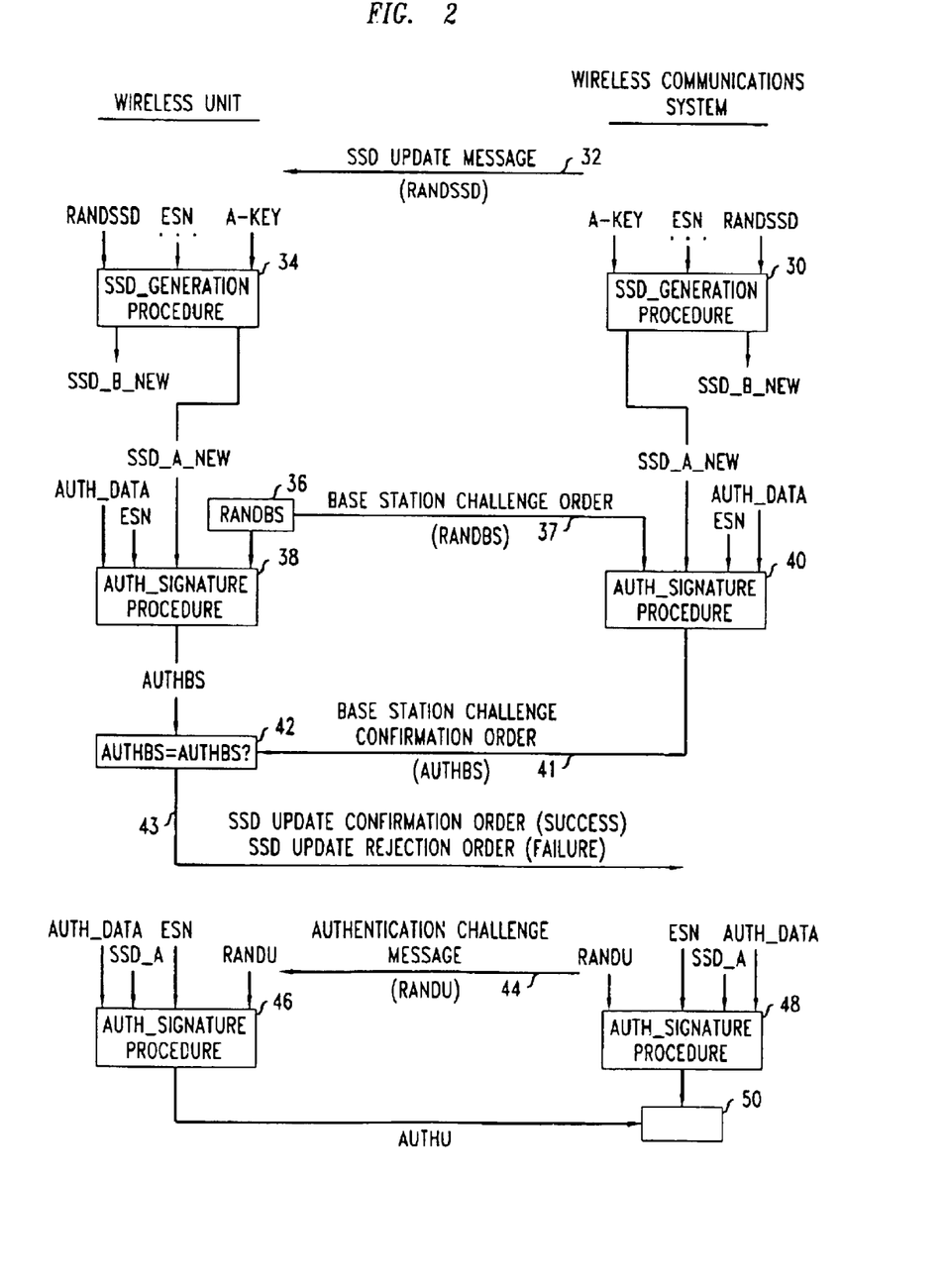
FIG. 2 illustrates a key update and separate authentication procedure used between a wireless unit and a wireless communication system based on IS-95B.

If the home authentication center 16 determines that the communications key value SSD needs to be updated, for example because certain criteria indicate that the SSD may be compromised, the SSD value associated with the wireless unit 14 can be updated. FIG. 2 shows the SSD update procedure followed by the standard identified as TIA/EIA-95-B entitled "Mobile Station-Base Station Compatibility Standard for Dual-Mode Spread Spectrum Systems" ("IS-95B") between the wireless unit and the wireless communications system. The wireless communications system can include the serving base station, the visiting authentication center, the visitor location register, the home authentication center, the home location register, the visited MSC and/or the home MSC.

To initiate the key update in this embodiment, the home authentication center 16 creates an update sequence RANDSSD. Using the RANDSSD sequence, the A-key and the ESN of the wireless unit as inputs to a cryptographic function, such as a SSD generation procedure 30, the home authentication center 16 generates a new key value (SSD-NEW). The home authentication center sends the RANDSSD sequence through the visiting authentication center and the serving base station in an update message, such as an SSD update message 32, to the wireless unit 14. The wireless unit 14 provides the RANDSSD sequence received from the communications system and generates the new communications key in the same manner as the communications system. For example, the wireless unit 14 provides RANDSSD, the A-key and the electronic serial number (ESN), which are stored at the wireless unit, to a cryptographic function, such as an SSD key generation procedure 34. The SSD key generation procedure 34 generates the SSD-NEW which is divided into SSD-A-NEW and SSD-B-NEW. The SSD generation procedures 30 and 34 implement the CAVE algorithm using a random number RANDSSD, ESN and the value A-KEY as inputs. The CAVE algorithm is well known in the art as a one-way function which inhibits the determination of the inputs to the function given the output.

Before accepting the new SSD values to be used in authentication and encryption procedures, the wireless unit validates the SSD-NEW and thereby authenticates the communications system. To do so, the wireless unit generates a random number RANDBS challenge at block 36. The wireless unit provides RANDBS and SSD-A-NEW along with additional data, such as the ESN and/or an AUTH_DATA string derived from an international mobile station identification number (IMSI), to a cryptographic function, such as a signature procedure 38. The signature procedure 38 generates the signature value AUTHBS. The wireless unit also sends the RANDBS to the wireless communications system, for example as part of a base station challenge 37. Using a corresponding cryptographic function, such as a signature procedure 40, the wireless communications system derives AUTHBS using RANDBS from the wireless unit, SSD-A-NEW from the SSD generation procedure 30 and the additional data, such as the ESN and/or the AUTH_DATA, used by the wireless unit to derive AUTHBS.

The wireless communications system sends the AUTHBS value generated by the signature procedure 40 to the wireless unit, for example in a base station challenge confirmation order 41. At block 42, the wireless unit compares the AUTHBS value generated at the wireless unit with the AUTHBS value sent from the system. If the comparison is successful, the wireless unit 14 directly validates the SSD-NEW and thereby authenticates the communications system. The wireless unit 14 sets the SSD-A value to SSD-A-NEW and the SSD-B value to SSD-B-NEW. The wireless unit then sends an SSD update confirmation 43 to the home authentication center indicating successful completion of the SSD update. Upon receipt of the SSD update confirmation, the home authentication center sets SSD-A and SSD-B to the SSD-A-NEW and SSD-B-NEW values generated by the system.

After the SSD update procedure, the wireless communications system typically authenticates the wireless unit to ensure the validity of the new SSD key value, for example to ensure that the wireless unit has properly calculated the new SSD key. The wireless communications system generates a sequence, such as a random challenge RANDU, and sends the sequence RANDU to the wireless unit, for example in an authentication challenge message 44. Upon receipt of the authentication challenge message 44, the wireless unit 14 provides at least a portion of sequence RANDU to a cryptographic function, for example to an authentication signature procedure 46 with the inputs ESN, AUTH_DATA, SSD-A and a RAND_CHALLENGE derived from RANDU and IMSI. The authentication signature procedure 46 generates the authentication signature value AUTHU as the output of the CAVE algorithm using the RAND_CHALLENGE, ESN, AUTH_DATA and SSD-A as inputs. The wireless communications system generates the authentication signature value AUTHU using the authentication signature procedure 48 in the same fashion. The wireless unit then transmits the value AUTHU calculated by the wireless unit to the wireless communications system. The wireless communications system compares the value AUTHU calculated by the system and the AUTHU value received from the wireless unit at block 50. If the values match, the wireless communications system has validated the new SSD value, and the wireless unit is authenticated.

If the wireless unit 14 is in a visiting communications system and the home communications system does not share the new communications key SSD-NEW with the visiting communications system for whatever reason, the visiting communications system merely acts as a conduit for communications between the wireless unit and the home communications system. As such, the above-described key update requires extensive communications between the home communications system and the visiting communications system in order for the wireless unit to authenticate the communications system. Additionally, the key update in the above scheme is followed by a separate authentication of the wireless unit by the communications system to ensure the validity of the SSD, thereby authenticating the wireless unit from the perspective of the communications system. Although providing mutual authentication of the wireless unit and the communications system, the separate authentication provides additional communications between the visiting communications system and the home communications system.

Figure 3A:
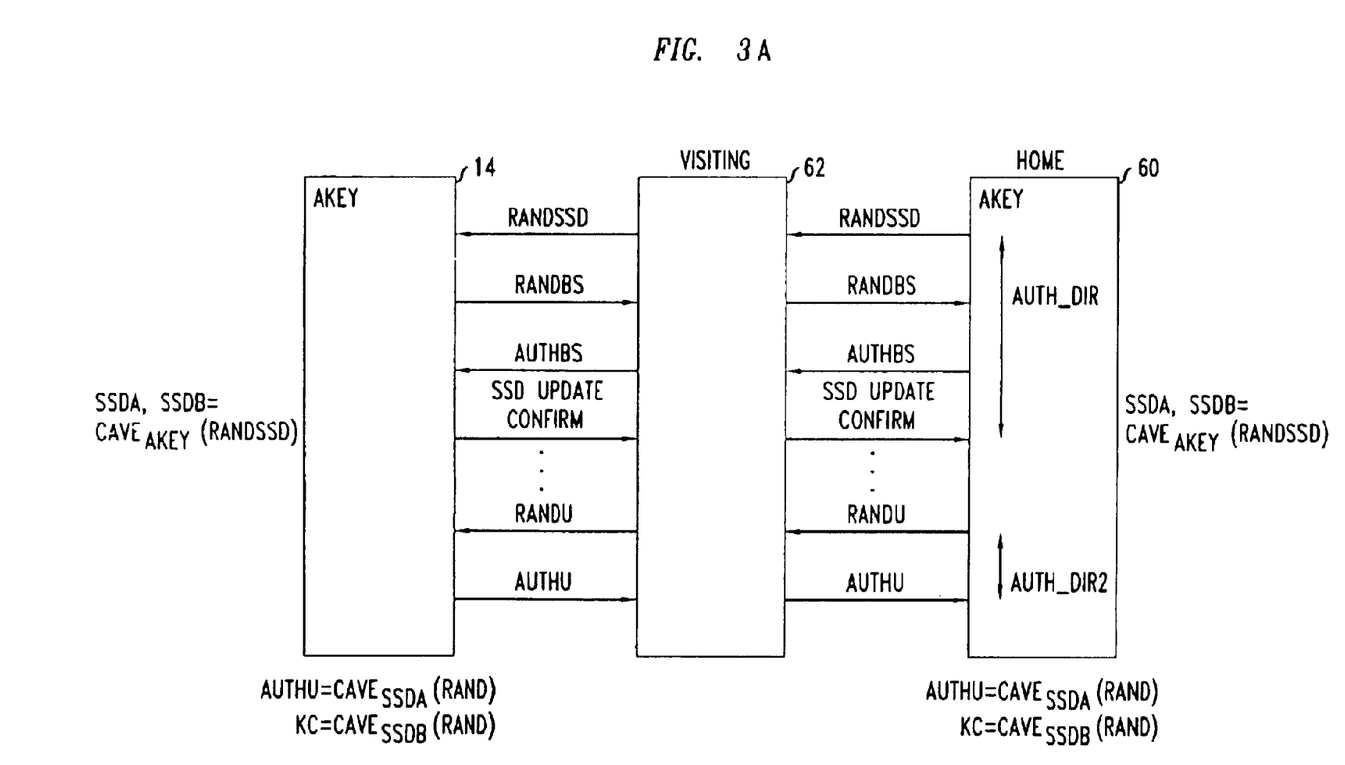
FIGS. 3A and 3B show the communications between a wireless unit, a visiting communications system and a home communications system for the update process in a typical network, such as an IS-41 compliant network.

For example, FIG. 3A shows how a wireless unit 14 is authenticated within a visiting communications system that is compatible with the IS-41 signaling standard. Both the wireless unit 14 and a home communications system 60 contain a secret value called A-KEY. When the wireless unit 14 requests access to a visiting system 62, the visiting system 62 requests data from the home system 60. In this embodiment, the home location register 22 (FIG. 1) associated with the wireless unit 14 is located using an identifier, such as the wireless unit's telephone number. The HLR 22 for the wireless unit 14 stores the secret value or key A-KEY which is used to generate the new communications key SSD-NEW. The SSD-NEW can be calculated by performing a CAVE algorithm using at least the sequence RANDSSD and the A-KEY as inputs. The CAVE algorithm is well known in the art and is specified in the IS-41 standard.

The home system 60 transfers the value RANDSSD to the visiting system, and the visiting system transmits the RANDSSD value to the wireless unit 14. The wireless unit 14 then calculates SSD in the same fashion as calculated by the home system 60 as shown by the equation SSD-A-NEW, SSD-B-NEW=$CAVE_{A\text{-}KEY}$(RANDSSD). The wireless unit 14 then sends the value RANDBS to the visiting system 62, and the visiting system 62 sends the value RANDBS to the home system 60. Using a corresponding cryptographic function, the home system 60 derives AUTHBS using RANDBS from the wireless unit 14. The home system 60 sends the AUTHBS value to the visiting system 62, and the visiting system 62 sends the AUTHBS value to the wireless unit 14. The communication of RANDBS to the home system 60 and the reply of the AUTHBS from the home system is a transaction which can be referred to as an authentication request or base station challenge. The wireless unit 14 compares the AUTHBS value generated at the wireless unit 14 with the AUTHBS value sent from the system. If the comparison is successful, the wireless unit will set the SSD-A value to SSD-A-NEW and the SSD-B value to SSD-B-NEW. The wireless unit then sends an SSD update confirmation order to the home system 60 through the visiting system 62 indicating successful completion of the SSD update. The communication of RANDSSD from the home system 60 and the receipt of the SSD update confirmation is a transaction which can be referred to as an authentication directive (AUTHDIR). Upon receipt of the SSD update confirmation order, the home system 60 sets SSD-A and SSD-B to the SSD-A-NEW and SSD-B-NEW values generated by the system.

Afterward, in the embodiment of FIG. 3A, the home system 60 initiates what can be referred to as a second authentication directive challenging the wireless unit 14 by sending a random number challenge RANDU to the wireless unit 14. The home system 60 sends the value RANDU to the visiting system 62 which sends the value RANDU to the wireless unit 14. Both the wireless unit 14 and home system 60 calculate the value AUTHU where AUTHU is equal to the output of a cryptographic function, such as the CAVE algorithm, using the random number RANDU and the SSD-A value as inputs as shown by AUTHU=CAVE$_{SSD-A}$ (RAND). The wireless unit 14 then sends the calculated value AUTHU to the visiting system 62, and the visiting system 62 sends the AUTHU value received from the wireless unit 14 to the home system 60. If the value AUTHU from the wireless unit 14 matches with the AUTHU value calculated at the home system 60, the new SSD value is validated from the perspective of the home system 60, and the wireless unit 14 is authenticated and given access to the visiting system.

Figure 3B:
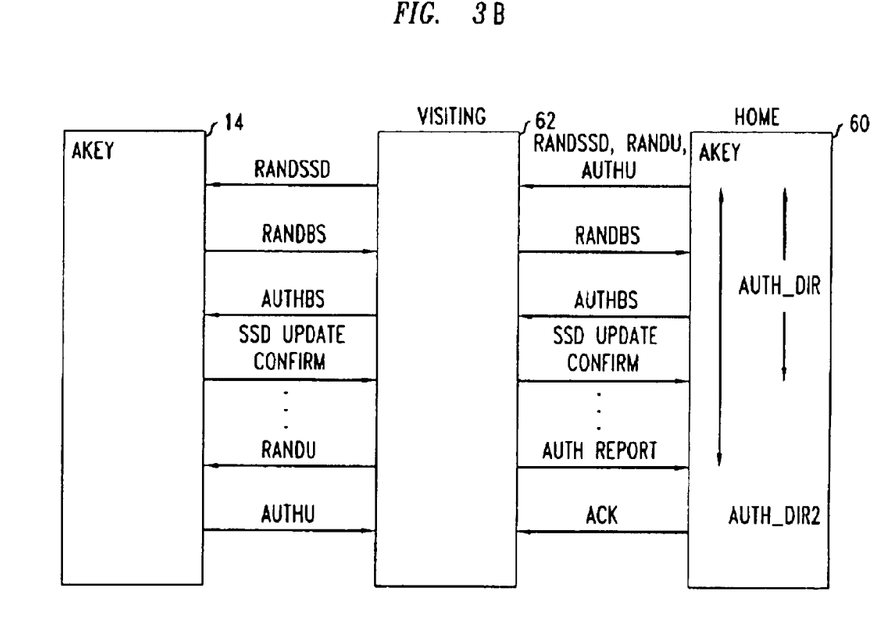

FIG. 3B shows an alternative implementation for performing an update of the SSD key in which the authentication of the home system and the wireless unit is performed. In this implementation, the home system 60 generates the value RANDSSD then calculates SSD-A-NEW as shown by the equation SSD-A-NEW, SSD-B-NEW=CAVE$_{A-KEY}$ (RANDSSD). The home system can also generate the value RANDU, and given SSD-A-NEW, the home system 60 can calculate AUTHU. The home system then sends RANDSSD along with RANDU and AUTHU to the visiting system 62. The visiting system 62 then forwards RANDSSD to the wireless unit 14 for the wireless unit to calculate SSD-A-NEW. The wireless unit 14 then sends the value RANDBS to the visiting system 62, and the visiting system 62 sends the value RANDBS to the home system 60. Using a corresponding cryptographic function, the home system 60 derives AUTHBS using RANDBS from the wireless unit 14. The home system 60 sends the AUTHBS value to the visiting system 62, and the visiting system 62 sends the AUTHBS value to the wireless unit 14. The wireless unit 14 compares the AUTHBS value generated at the wireless unit 14 with the AUTHBS value sent from the system. If the comparison is successful, the wireless unit will set the SSD-A value to SSD-A-NEW and the SSD-B value to SSD-B-NEW.

The wireless unit then sends an SSD update confirmation order to the home system 60 through the visiting system 62 indicating successful completion of the SSD update. Upon receipt of the SSD update confirmation order, the home system 60 sets SSD-A and SSD-B to the SSD-A-NEW and SSD-B-NEW values generated by the system. Now, because RANDU and AUTHU are already at the visiting system 62, the visiting system 62 sends RANDU to the wireless unit 14. The wireless unit 14 uses the RANDU value to calculate AUTHU and send AUTHU to the visiting system 62. If the value AUTHU from the wireless unit 14 matches with the AUTHU value calculated at the home system 60, the visiting system 62 sends an authentication report to the home system 60 regarding the SSD update to which the home system 60 responds with an acknowledgment (ACK) signal.

The above described key update and/or the subsequent authentication of the wireless unit use a significant number of communications between the home system and the visiting system which consume system resources if the home communications system retains the communications key.

SUMMARY OF THE INVENTION

The present invention involves a system for updating a communications key(s) by performing an authentication(s) of the unit and/or of the communications system using an update key. By using the update key to perform the authentication(s), the key update system can reduce communications between a home communications system and a visiting communications system by sending the update key to the visiting communications system while maintaining the communications key at the home communication system. For example, in performing a key update, the home communications system generates a communications key, such as a new authentication key SSD-A-NEW, using a sequence RANDSSD generated at the home communications system and a secret key A-KEY maintained at the home communications system and at the unit. The home communications system generates the update key SSD-KEY also using the sequence RANDSSD and the secret key A-KEY. The home communications system sends the update key SSD-KEY and the sequence RANDSSD to the visiting communications system, and the visiting communications system sends the sequence RANDSSD to the unit. The unit generates the new communications key, such as the new authentication key SSD-A-NEW, and the update key SSD-KEY in the same manner as the home communications system. Because the visiting communications system has the update key SSD-KEY, the visiting authentication system can generate the signature value(s) AUTHSSD and/or AUTHBS using the update key at the visiting communications system to authenticate the unit and/or the communications system.

BRIEF DESCRIPTION OF THE DRAWINGS

Other aspects and advantages of the present invention may become apparent upon reading the following detailed description and upon reference to the drawings in which.

DETAILED DESCRIPTION

An illustrative embodiment of the key update using an update key according to the principles of the present invention is described below which provides an improved key update procedure between a unit, such as a wireless unit, and a communications system, such as a wireless communications system. For example, a communications system can initiate an update of a communications key, such as a shared secret data (S SD) key, if certain criteria indicate that the communications key may be compromised or for any other reason (for example, to be initialized). The communications key is a key used by the unit and the communications system to further secure communications between the unit and the communications system. The communications key or portions thereof can be an authentication key, an encryption key, a key generation key and/or an integrity key used to digitally sign the contents of communications. The communications key SSD can be divided into other communications keys, such as an authentication key SSD-A and an encryption key SSD-B. The SSD-A is used in authentication procedures, and the SSD-B is used in key generation, for example in generating the cipher key Kc, or in encryption procedures. The key update system updates the communications key, and thereby the authentication key used in performing authentication of the unit by the communications system, which can include the home and/or visiting communications systems, using an update key. In the described embodiments, the update key is generated as part of the update procedure in addition to the communications key and used to perform authentication(s) during the update of the communications key. Depending on the embodiment and/or whether the wireless unit is registering with a visiting or home communications system, the key update system and portions thereof can be implemented in different portions of the communications system, such as the serving base station, the visiting authentication center, the visited MSC, the visitor location register, the home location register, the home MSC and/or the home authentication center.

In performing the key update, the communications system generates a new communications key (for example the new communications key SSD-NEW or the new authentication key SSD-A-NEW) using at least the secret value A-KEY associated with the unit. In accordance with an aspect of the present invention, the communications system generates the update key, which is different than the new communications key(s), using at least a portion of the secret value A-KEY and/or at least a portion of the information used to generate the new communications key(s). The unit authenticates the communications system using the update key, and/or the communications system updates the unit using the update key. Once the authentication is performed, the unit and the communications system update the communications key(s) with the new communication key(s) to enable further communications between the unit and the communications system, and the update key can be discarded. As such, the update key can be treated as a temporary key to be used to perform authentication(s) during the update of the communications key(s).

Figure 4:
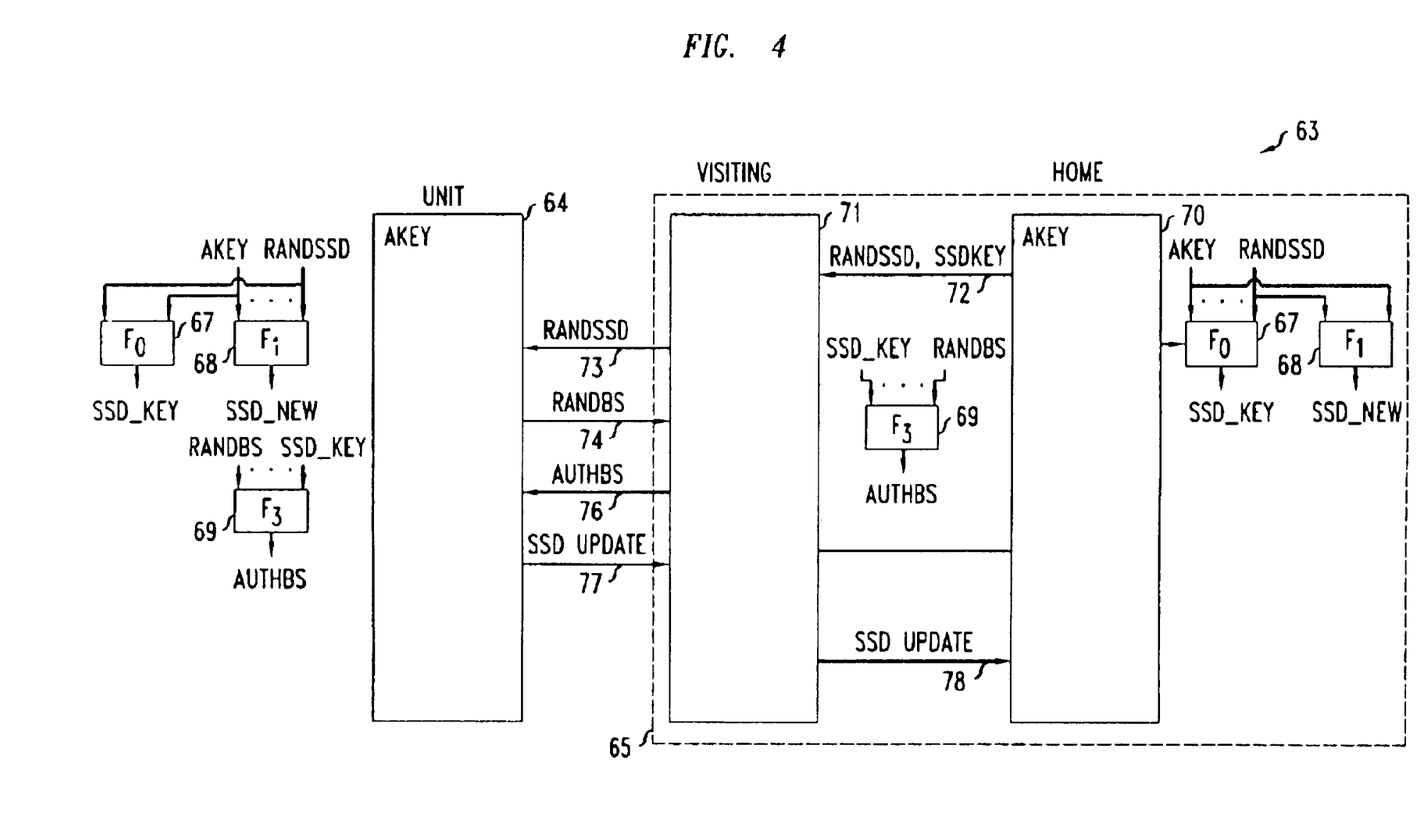
FIG. 4 shows an embodiment of the key update system using an update key for authenticating the communications system according to the principles of the present invention.

FIG. 4 shows an embodiment 63 of a key update system using an update key SSD-KEY where the communications key SSD (the authentication key SSD-A along with the encryption key SSD-B) is updated after a unit 64 authenticates a communications system 65 using the update key. A unit 64 and the communications system 65 each have a secret value A-key associated with the unit 64. When performing an update of a communications key SSD, the communications system creates a RANDSSD sequence which is provided to the unit 64. The sequence RANDSSD can be a random number, a pseudo-random number which repeats after a certain period or the output of an ever-increasing counter the received value of which cannot be less than or equal to a previously received value. The communications system 65 calculates a new communications key SSD-NEW by taking the output of a cryptographic function 67 (F0) using the sequence RANDSSD and the secret key A-key as inputs. The communications system 65 also calculates an update key SSD-KEY by taking the output of a cryptographic function 68 (F1) using the sequence RANDSSD and the secret key A-key as inputs.

In this embodiment, the cryptographic function 67 is different than the cryptographic function 68, thereby resulting in an update key SSD-KEY which is different than the new communications key SSD-NEW or at least different than the authentication key SSD-A-NEW. For example, given the inputs RAND SSD and A-KEY, the cryptographic functions 67 and 68 produce SSD-KEY and the new communications key SSD-NEW as unrelated outputs where, given one of the outputs, the other output cannot be predicted. Depending on the embodiment, the cryptographic functions 67 and 68 could be the same or different while using different portions of the sequence RANDSSD and A-KEY as inputs to generate an update key which is different than the authentication key. Depending on the embodiment, the key update system can use additional input(s) to the key generation procedure 67 and/or 68, for example a value which is characteristic of the wireless unit or the subscription, such as the ESN and/or IMSI. The key generation procedures 67 and/or 68 implement the CAVE algorithm using the random number RANDSSD and the value A-KEY as inputs as well as any additional inputs. The CAVE algorithm is well known in the art as a one-way function. Other generation procedures can be used.

The communications system 65 sends the update sequence RANDSSD to the unit 64, and the unit 64 generates the new communications key SSD-NEW and the update key SSD-KEY in the same manner as the communications system 65. To authenticate the communications system 65, the unit generates an update sequence RANDBS and sends the sequence RANDBS to the communications system 65. The sequence RANDBS can be a random number, pseudo-random number which repeats after a certain period or the output of an ever-increasing counter the received value of which cannot be less than or equal to a previously received value. The unit 64 generates a signature value AUTHBS using at least the sequence RANDBS and the update key generated at the unit 64. To generate AUTHBS, the unit provides RANDBS and SSD-KEY along with any additional data, such as the RANDSSD, ESN and/or an AUTH_DATA string derived from an international mobile station identification number (IMSI), to a signature procedure 69. Depending on the embodiment, the signature procedure 69 is a cryptographic function which could use different inputs to the signature procedure 69. The signature generation procedure 69 can implement the CAVE algorithm using the random number RANDBS and the update key SSD-KEY as inputs as well as any additional inputs.

The key generation procedures 67 and 68 and the signature procedure 69 can be hash functions or any one-way cryptographic function, such as the CAVE algorithm and/or SHA-1. Other generation procedures can be used. Hash functions can be characterized as one way functions (a function for which it is not feasible to regenerate the inputs given the output), as functions which produce a many to one mapping of inputs to outputs, and/or as functions which produce outputs with less information than the inputs, thereby the inputs are difficult to ascertain given the output. In such functions, the output is referred to as a signature of the input.

The communications system 65 generates a signature value AUTHBS using the update key SSD-KEY generated at the communications system 65 and the sequence RANDBS received from the unit 64 as inputs to signature generation procedure 69 in the same manner as the unit 64. The communications system 65 sends AUTHBS to the unit 64. The unit 64 authenticates the communications system 65 by comparing the signature value AUTHBS received from the communications system 65 with a signature value AUTHBS generated at the unit 64. The unit 64 informs the communications system 65 of the results of the comparison. After the unit 64 authenticates the communications system using the update key SSD-KEY, the communications key is updated with the new communications key, and the update key can be discarded.

In the embodiment described below of FIG. 4, the communications system 65 can further include a home communications system 70 and a visiting communications system 71. In accordance with another aspect of the present invention, the home communications system 70 sends the update key SSD-KEY to the visiting communications system 71 along with information for the unit to use in determining the communications key(s) and/or the update key. The visiting communications system 71 and the unit 64 perform an authentication using the update key, thereby enabling a reduction in the number of communications between the home communications system 70 and the visiting communications system 71, and the home communications system 70 can retain the new communications key(s) at the home communication system 71 at least until after the key update is complete.

In this embodiment, a home communications system 70 generates a new communications key(s) SSD-NEW using at least the update sequence RANDSSD and the secret value A-KEY stored in the home communication system 70 and associated with the unit 64 or portions thereof. The home communications system 70 also generates the update key using at least the update sequence RANDSSD and the secret value A-KEY or portions thereof in the same manner as the unit 64 as described above. The home communications system 65 sends the update sequence RANDSSD and the update key SSD-KEY to the visiting communications system 71 in an update directive 72, and the visiting communications system 71 sends in a message 73 the update sequence RANDSSD to the unit 64 where the new communications key SSD-NEW (including the communications keys SSD-A-NEW and SSD-B-NEW in this embodiment) and the update key SSD-KEY are generated in the same manner as in the home communications system 70. The unit 64 generates a challenge sequence RANDBS and a signature value AUTHBS using the update key and the challenge sequence RANDBS (including portions thereof) as inputs to the cryptographic function 69.

The unit 64 sends the challenge sequence RANDBS in a message 74 to the visiting communications system 71 where the visiting communications system 71 generates a signature value AUTHBS using at least the update key SSD-KEY and the sequence RANDBS as inputs to the cryptographic function 69. Rather than forward RANDBS to the home communications system 106 to generate AUTHBS and have the home communications system 70 send AUTHBS to the visiting communications system 71, the communications can be reduced by sending the update key SSD-KEY to the visiting communications system 71 which generates the signature value AUTHBS in the same manner as the unit 64. The visiting communications system 71 sends AUTHBS in a message 76 to the unit 64. The unit 64 authenticates the communications system by comparing the signature value AUTHBS received from the visiting communications system 71 with the signature value AUTHBS generated at the unit 64. The unit 64 informs the visiting communications system 71 of the results of the comparison in a message 77, and the visiting communications system 71 informs the home communications system 70 of the results of the comparison in a message or authentication report 78. After the unit 64 authenticates the communications system using the update key, the communications key SSD (including the authentication key SSD-A) is updated with the new communications key SSD-NEW (including the new authentication key SSD-A-NEW). As such, the new authentication key was not shared with the visiting communication system 71, nor were signature values used in the authentication(s) calculated using the new authentication key. The home communications system 70 can now share the communications key, such as the communications key SSD-A, with the visiting communications system 71 or not, and the update key can be discarded or not.

Figure 5A:
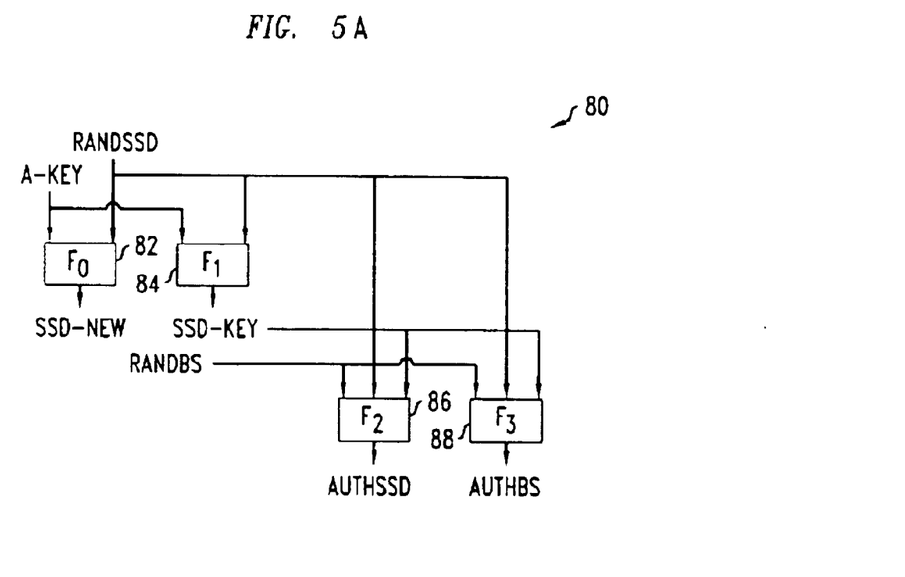
FIG. 5A illustrates a method for producing an update key and a communication key in performing a key update with mutual authentication according to principles of the present invention.

In accordance with an aspect of the present invention, FIG. 5A shows an embodiment of a key and signature value generation procedure 80 to generate the update key SSD-KEY and using the update key to generate signature values AUTHSSD and AUTHBS used by the unit and the communications system to mutually authenticate each other in performing a key update. The unit and the communications system each have a secret value A-key associated with the unit. When performing an update of a communications key, such as a communications key SSD (including an authentication key SSD-A and an encryption key SSD-B), the communications system creates the update sequence RANDSSD which is provided to the unit. The sequence RANDSSD can be a random number, a pseudo-random number which repeats after a certain period or the output of an ever-increasing counter the received value of which cannot be less than or equal to a previously received value.

The communications system calculates a new communications key SSD-NEW by taking the output of a cryptographic function 82 (F0) using the sequence RANDSSD and the secret key A-key as inputs. The communications system also calculates an update key SSD-KEY by taking the output of a cryptographic function 84 (F1) using the sequence RANDSSD and the secret key A-KEY as inputs. In this embodiment, the cryptographic function 82 is different than the cryptographic function 84, thereby resulting in an update key which is different than the new communications key SSD-NEW or at least different than the authentication key SSD-A-NEW. Depending on the embodiment, the cryptographic functions 82 and 84 could be the same or different while using different portions of the sequence RANDSSD and A-KEY as inputs to generate an update key which is different than the new communications key SSD-NEW or at least different than the authentication key SSD-A-NEW. Depending on the embodiment, the key update system can use additional input(s) to the key generation procedure 82 and/or 84, for example a value which is characteristic of the wireless unit or the subscription, such as the ESN and/or IMSI. The key generation procedures 82 and/or 84 implement the CAVE algorithm using the random number RANDSSD and the value A-KEY as inputs as well as any additional inputs. The CAVE algorithm is well known in the art as a one-way function. Other generation procedures can be used.

After receiving RANDSSD from the communications system, for example in an SSD update message, the unit can generate the new communications key SSD-NEW and the update key SSD-KEY in the same manner as the communications system. After generating the new communications key value (SSD-NEW), the unit and the communications system can perform authentications using the update key (SSD-KEY). To do so, the unit generates a number or sequence RANDBS, such as a random number challenge. The sequence RANDBS can be a random number, pseudo-random number which repeats after a certain period or the output of an ever-increasing counter the received value of which cannot be less than or equal to a previously received value. If the unit authenticates the communications system, for example using a signature value derived from the sequence RANDBS, and the communications system authenticates the unit, for example using a signature value derived from the sequence RANDSSD, the communications system and the unit are involved in a mutual authentication, but not necessarily an interlocking mutual authentication. In this embodiment, an interlocking, mutual authentication is performed using the update key because RANDBS generated by the unit and RANDSSD generated by the communications system are both used in generating each of the signature values AUTHSSD and AUTHBS used in the authentications by the unit and the communications system. By using the random sequence from the communications system (RANDSSD) and the random sequence from the unit (RANDBS) to generate the signature values involved in the mutual authentication, the authentications by the unit and the communications system are interlocking and not vulnerable to a "Replay" attack where a Random number challenge and corresponding signature value is obtained and can be repeatedly used to gain unauthorized access to the unit and/or the system.

Depending on the embodiment, the update key can be used to generate at least one signature value in a single, mutual and/or interlocking authentication between the unit and the communications system. In this embodiment, the unit provides RANDBS, RANDSSD and SSD-KEY along with any additional data, such as the ESN and/or an AUTH__DATA string derived from an international mobile station identification number (IMSI), to a signature procedure 86. The signature procedure 86 generates the signature value AUTHSSD. The unit provides RANDBS, RANDSSD and SSD-KEY along with any additional data, such as the ESN and/or an AUTH_DATA string derived from an international mobile station identification number (IMSI), to a signature procedure 88. The signature procedure 88 generates the signature value AUTHBS.

Depending on the embodiment, the signature procedures 86 and 88 are cryptographic functions which could be the same or different while using different portions of the values RANDBS, RANDSSD and/or SSD-KEY or values derived therefrom as inputs. Depending on the embodiment, the key update system can use different inputs to the signature procedure 86 and/or 88, for example RANDBS could be removed as an input to the signature procedure 86 and RANDSSD removed as an input to signature procedure 88. As such, the mutual authentication would no longer be interlocking. The signature generation procedures 86 and/or 88 can implement the CAVE algorithm using the random number RANDSSD, RANDBS and the update key SSD-KEY as inputs as well as any additional inputs. The CAVE algorithm is well known in the art as a one-way function. Other generation procedures can be used.

The communications system determines AUTHSSD in the same manner as the unit. In this embodiment, the communications system receives RANDBS from the unit and generates AUTHSSD using the update key SSD-KEY, RANDSSD and RANDBS in the same manner as the unit. With AUTHSSD, the communications system can authenticate the unit upon receiving the AUTHSSD value generated at the unit and comparing the AUTHSSD value generated at the unit with the AUTHSSD value determined by the communications system. The communications system can also determine AUTHBS in the same manner as the unit using the update key SSD-KEY. The communications system sends the signature value AUTHBS to the unit, and the unit authenticates the communications system by comparing the signature value AUTHBS received from the communications system with the signature value AUTHBS generated at the unit. If the authentication is successful, the unit and the communications system can set the value of the communications key SSD to the value of the new communications key SSD-NEW. Accordingly, in this embodiment, the authentication key SSD-A is replaced with the new authentication key SSD-A-NEW. As mentioned above, in this embodiment, the new value SSD can be divided into SSD-A and SSD-B where SSD-A is used in authentication procedures and the SSD-B is used in key generation, for example in generating the cipher key Kc, or encryption procedures.

Given the new encryption key SSD-B, both the unit and the communications system calculate the value of cipher key $K_C$ where the value $K_C$ is equal to the output of the CAVE algorithm using the value SSD-B as the key input and additional information, such as a sequence RAND generated by the communications system, as an input as shown by $K_c=CAVE_{SSD-B}(RAND)$. At this point, communications between the wireless unit and the communications system are permitted and may be encrypted using a cryptographic function where the inputs are the message to be encrypted and the key $K_C$. The cryptographic functions are specified for code division multiple access (CDMA), time division multiple access (TDMA) and global system mobile (GSM) systems by their respective standards.

The key update using the update key can be carried out periodically, when the wireless communications system determines that the shared key SSD may be compromised based on certain criteria, when the wireless unit returns to the home communications system or a trusted visiting communications system, when the A-key is changed, when a new subscription is established to initialize the SSD value, and/or for other reasons. Additionally, depending on the embodiment, the inputs to the key generation procedures 82 and 84 and the signature procedures 86 and 88 can include values different from or in addition to those mentioned above or inputs derived from those and other values. For example, at least portions of the electronic serial number (ESN) of the wireless unit, the phone number (MIN1) of the wireless unit and/or the IMSI of the wireless unit can be used as an input(s) to the key generation and signature procedures 82, 84, 86 and 88. The key generation procedures 82 and 84 and the signature procedures 86 and 88 can be hash functions or any one-way cryptographic function, such as the CAVE algorithm and/or SHA-1. Other procedures are possible.

Depending on the embodiment, the communications for the key update using the update key can take place between the wireless unit and the home authentication center (through the visiting authentication center if the wireless unit is in a visiting network). In alternative embodiments, the key update using the update key and portions thereof can be performed in other or different locations.

Figure 5B:
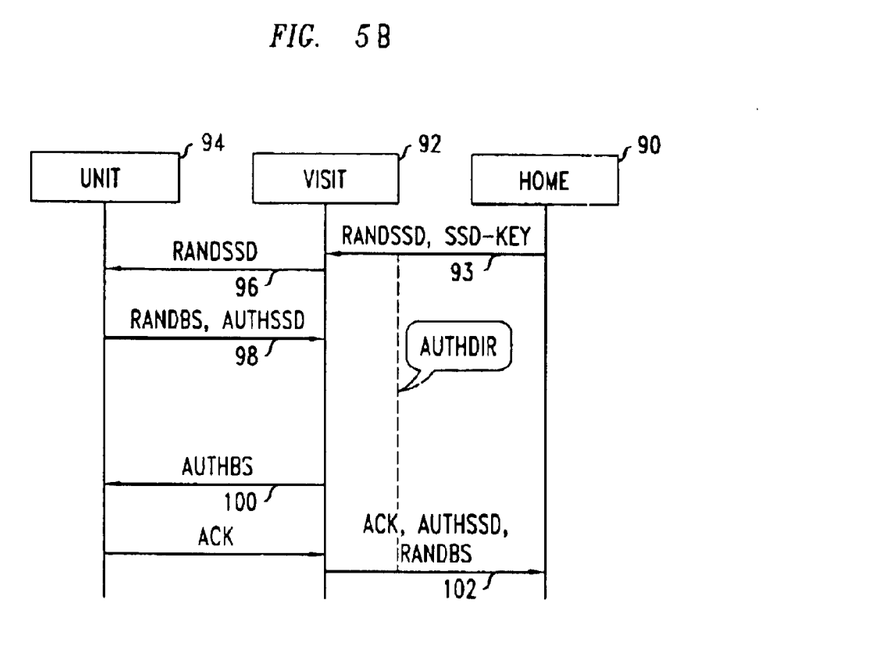
FIG. 5B shows a flow diagram of an embodiment of the key update suystem using an update key to perform a mutual authentication according to principles of the present invention.

FIG. 5B shows an embodiment of a key update system using the update key to perform a mutual authentication between the unit and the communications system that uses a reduced number of communications between the home communications system and the visiting communications system while retaining the new communications key SSD-NEW at the home communications system. For example, a home communications system 90 generates and sends the sequence RANDSSD along with the update key SSD-KEY to the visiting communications system 92 as part of an update directive 93. The visiting communications system 92 sends the sequence RANDSSD to a unit 94 in an update message 96, and the unit 94 uses RANDSSD to generate the update key SSD-KEY. The unit 94 generates the sequence RANDBS and sends RANDBS to the visiting communications system 92 in a random challenge message 98 along with a signature value AUTHSSD generated at the unit 94 using the update key SSD-KEY. The visiting communications system 92 generates the signature value AUTHSSD in the same manner as the unit 94 using the update key SSD-KEY. The visiting communications system 92 authenticates the unit 94 by comparing the signature value AUTHSSD received from the unit 94 with the signature value AUTHSSD generated at the visiting communications system 92.

To reduce the number of communications between the home communications system 90 and the visiting authentication system 92 while maintaining the new communication key SSD-NEW at the home communications system 90, the visiting communications system 92 generates the signature value AUTHBS using the sequence RANDBS and the update key in the same manner as the unit 94. As such, the visiting communications system 92 does not need to forward the sequence RANDBS to the home communications system 90 nor does the home communications system 90 have to send the signature value AUTHBS to the visiting communications system 92. The visiting communications system 92 sends the signature value AUTHBS in a challenge response 100 to the unit 94. The unit 94 authenticates the communications system by comparing the signature value AUTHBS received from the visiting communications system 92 and the signature value AUTHBS generated at the unit 94.

If the comparison is successful, the mutual authentication is complete, and the unit 94 informs the visiting communications system 92 of the results of the update in a message 102. The visiting communications system 92 informs the home communications system 90 of the results of the update in a message 102, for example as part of an authentication report. The message 102 can include additional information, for example parameters used in the mutual authentication process, such as the signature value AUTHSSD and RANDBS, so that the home communication system can determine whether the visiting communications systems did a proper update. If the update and mutual authentication is successful, the unit 94 sets the communications key SSD (SSD-A and SSD-B) to the new communications key SSD-NEW (SSD-A-NEW, SSD-B-NEW). After the key update, the update key can be discarded.

In addition to the embodiment(s) described above, the key update system according to the principles of the present invention can be used which omit and/or add input parameters to the key generation and signature procedures and/or use variations or portions of the described system. For example, the key update has been described as using the update key to perform a mutual authentication of the unit and the communications system, but the key update can perform a one-way authentication by comparing signature values generated using the update key.

Depending on the embodiment, the inputs for the key generation and signature procedures can be communicated from different sources to the unit, the visiting communications system and/or the home communications system. For example, if the ESN is used as an input to the signature procedure(s) and the visiting communications system performs the calculation of AUTHBS and AUTHSSD, the ESN could be transmitted to the visiting communications system from the home communications system. It should be noted that with regard to IS-41, communications between the visiting communications system and the home communications system are typically carried out each time the wireless unit registers with the visiting communications system as opposed to each time a call is made to the unit. It is also possible to carry out the same procedures when the wireless unit is in the home communications system. In that case, the home communications system, rather than the visiting communications system, communicates with the unit. The communications between the unit and the communications system pass through a serving base station.

Furthermore, the key update system can be used with communications systems based on a variety of multiple access techniques, such as CDMA, TDMA, FDMA or GSM, to update a communications key using an update key to perform an authentication in the key update. For example, the key update system can be used in systems operating under a variety of standards, such as the standard identified as TIA/EIA/IS-2000 Standards for CDMA 2000 Spread Spectrum Systems, the standard identified as EIA/TIA/IS-553 for Cellular System Mobile Station-Land Station Compatibility Specification, the standard identified as IS-136 for Cellular System Dual Mode Mobile Station-Base Station: Digital Control Channel or other standards. It should be understood that different notations, references and characterizations of the various values, inputs and architecture blocks can be used. For example, the functionality described for the home communications system can be performed in a home authentication center, home location register (HLR) and or a home MSC and the functionality for the visiting communications system can be performed in a visiting authentication center, a visitor location register and/or in a visiting MSC. It should be understood that the system and portions thereof and of the described architecture can be implemented in or integrated with processing circuitry in the unit or at different locations of the communications system, or in application specific integrated circuits, software-driven processing circuitry, firmware or other arrangements of discrete components as would be understood by one of ordinary skill in the art with the benefit of this disclosure. What has been described is merely illustrative of the application of the principles of the present invention. Those skilled in the art will readily recognize that these and various other modifications, arrangements and methods can be made to the present invention without strictly following the exemplary applications illustrated and described herein and without departing from the spirit and scope of the present invention.

What is claimed is:

1. A method of updating a communications key maintained in a unit for communicating with a communications system, said method comprising:

generating a new communications key using a secret value stored in said unit;

generating an update key using said secret value stored in said unit;

generating a signature value using said update key;

comparing said signature value with a signature value received from a visiting communications system of said communications system which was generated by said visiting communications system using an update key derived by a home communications system of said communications system; and updating said communications key with said new communications key depending on the results of said comparison.

2. The method of claim 1 comprising:

receiving an update sequence; and generating said new communications key using said secret value stored in said unit and said update sequence.

3. The method of claim 2 further comprises:

generating a challenge sequence;

sending said challenge sequence to said visiting communications system;

generating said signature value using said challenge sequence and said update key;

receiving said signature string generated by said visiting communications system using said challenge sequence and said update key; and comparing said signature value with said signature value generated by said visiting communications system.

4. The method of claim 3 comprises:

generating a second signature value using said update sequence a nd said up date key; and sending said second signature value to said visiting communications system for comparison with a second signature value generated by said visiting communications system using said sequence and said update key generated at said communications system.

5. The method of claim 3 wherein said generating said signature value includes:

developing a signature string comprising at least portions of said update sequence, said challenge sequence and said update key; and generating said signature value from at least said signature string.

6. The method of claim 4 wherein said generating said signature value includes:

developing a second signature string comprising at least portions of said update sequence, said challenge sequence and said update key; and generating said second signature value from at least said second signature string.

7. A method of updating a communications key maintained in a unit and in a communications system, said method comprising:

receiving by a visiting communications system from a home communications system an update sequence and an update key derived by said home communications system using a secret value associated with said unit and stored in said home communications system;

sending by said visiting communications system to said unit said update sequence for said unit to generate a new communications key using a secret value in said unit;

generating a signature value at said visiting communications system using said update key derived by said home communications system;

sending by said visiting communications system to said unit said signature value generated at said visiting communications system for said unit to compare with a signature value generated at said unit using an update key generated by said unit using said secret value stored in said unit; and receiving an update confirmation depending on the results of said comparison.

8. The method of claim 7 wherein said generating a signature value including:

receiving a challenge sequence from said unit; and generating said signature value using said challenge sequence and said update key.

9. The method of claim 8 including:

generating a second signature value using said update sequence and said update key;

receiving a second signature value generated at said unit using said update sequence and said update key at said unit; and comparing with said second signature value with said second signature value generated by said unit.

10. The method of claim 9 wherein said generating a signature value including:

developing a signature string comprising at least portions of said update sequence, said challenge sequence and said update key; and generating said signature value from at least said signature string.

11. The method of claim 9 wherein said generating a second signature value including:

developing a second signature string comprising at least portions of said update sequence, said challenge sequence and said update key; and generating said second signature value from at least said second signature string.

12. A method of updating a communications key maintained in a unit and in a communications system, said method comprising:

generating an update sequence;

generating by a home communications system a new communications key using a secret value stored in said home communications system and associated with said unit;

generating by said home communications system an update key using said secret value;

sending said update key to a visiting communications system for said visiting communications system to generate a signature value, using said update key derived by said home communications system, which is sent to said unit for comparison to a signature value generated at said unit using an update key generated at said unit using a secret value stored in said unit;

updating said communications key with said new communications key depending on the results of said comparison.

13. A method of updating a communications key maintained in a unit and in a home communications system, said method comprising:

receiving an update sequence from said home communications system for said unit to generate a new communications key using a secret value in said unit;

receiving an update key from said home communications system and generated at said home communications system using a secret value associated with said unit at said home communications system;

generating by a visiting communications system a signature value using said update key derived by said home communications system;

performing an authentication with said unit using said signature value; and sending to said home communications system the results of said authentication.

14. A communications key update system for updating a communications key maintained in a unit for communicating with a communications system, said system configured to generate a new communications key using a secret value stored in said unit, generate an update key using said secret value stored in said unit, generate a signature value using said update key, compare said signature value with a signature value received from a visiting communications system of said communications system which was generated by said visiting communications system using an update key derived by a home communications system of said communications system, and update said communications key with said new communications key depending on the results of said comparison.

15. A key update system for updating a communications key maintained in a unit and in a communications system, said system configured to receive from a home communications system an update sequence and an update key derived by said home communications system using a secret value associated with said unit and stored in said home communications system, to send to said unit said update sequence for said unit to generate a new communications key using a secret value in said unit, to generate a signature value at said visiting communications system using said update key derived by said home communications system, to send to said unit said signature value for said unit to compare with a signature value generated at said unit using an update key generated by said unit using said secret value stored in said unit, and to receive an update confirmation depending on the results of said comparison.

16. A key update system for updating a communication key maintained in a unit and in a communications system, said system configured to generate an update sequence, to generate a new communications key using a secret value stored in said system and associated with said unit, to generate by a home communications system an update key using said secret value, to send said update key to a visiting communications system for said visiting communications system to generate a signature value, using said update key derived by said home communications system, which is sent to said unit for comparison to a signature value generated at said unit using an update key generated at said unit using a secret value stored in said unit, and to update said communications key with said new communications key depending on the results of said comparison.

* * * * *